United States Patent [19]
Sonders

[11] Patent Number: 5,307,048
[45] Date of Patent: Apr. 26, 1994

[54] VEHICLE SECURITY SYSTEM INCLUDING AN ANTI-CARJACKING SYSTEM

[75] Inventor: David G. Sonders, Fairfax, Va.

[73] Assignee: Protect & Defend, Inc., Springfield, Va.

[21] Appl. No.: 992,931

[22] Filed: Dec. 18, 1992

[51] Int. Cl.$^5$ .......................................... B60R 25/10
[52] U.S. Cl. ........................ 340/426; 340/425.5; 307/10.2; 180/287
[58] Field of Search ...................... 340/426, 425.5, 428, 340/430, 528, 527, 522, 523, 543, 576; 307/10.2, 10.3, 10.4-10.6; 180/287, 271

[56] References Cited

U.S. PATENT DOCUMENTS

| | | | |
|---|---|---|---|
| 3,639,897 | 2/1972 | Teich | 340/522 |
| 3,646,515 | 2/1972 | Vodehnal | 340/426 |
| 3,665,386 | 5/1972 | Dosch | 180/114 |
| 3,735,346 | 5/1973 | Fox | 180/114 |
| 3,781,789 | 12/1973 | Caleskie et al. | 307/10 AT |
| 3,858,175 | 12/1974 | Kopera, Jr. | 180/114 |
| 4,064,547 | 12/1977 | Zagwyn | 361/172 |
| 4,133,410 | 1/1979 | Krusoe | 180/114 |
| 4,143,368 | 3/1979 | Route et al. | 340/543 |
| 4,159,466 | 6/1979 | Mengel | 340/545 |
| 4,302,747 | 11/1981 | Belmuth | 180/287 |
| 4,354,189 | 10/1982 | Lemelson | 340/543 |
| 4,383,242 | 5/1983 | Sassover et al. | 340/539 |
| 4,438,426 | 3/1984 | Adkins | 180/287 |
| 4,446,380 | 5/1984 | Moriya et al. | 361/172 |
| 4,452,197 | 6/1984 | Weber | 180/287 |
| 4,485,887 | 12/1984 | Morano | 180/287 |
| 4,691,801 | 9/1987 | Mann et al. | 180/287 |
| 4,745,897 | 5/1988 | Tejeda | 180/287 |
| 4,754,255 | 6/1988 | Sanders et al. | 340/539 |
| 4,794,368 | 12/1988 | Grossheim et al. | 340/527 |
| 4,804,856 | 2/1989 | Hanisko et al. | 361/172 |
| 4,811,013 | 3/1989 | Akutsu | 180/287 |
| 4,838,377 | 6/1989 | Kozaki et al. | 180/287 |
| 4,884,055 | 11/1989 | Memmola | 180/287 |
| 4,887,064 | 12/1989 | Drori et al. | 340/426 |
| 4,888,575 | 12/1989 | De Vaulx | 340/426 |
| 4,892,167 | 1/1990 | Tejeda | 180/287 |
| 4,901,054 | 1/1990 | Waterman | 340/426 |
| 4,910,493 | 3/1990 | Chambers et al. | 340/426 |
| 4,922,224 | 1/1990 | Drori et al. | 340/428 |
| 4,958,084 | 9/1990 | Carlo et al. | 340/426 |
| 4,990,890 | 2/1991 | Newby | 340/539 |
| 5,041,810 | 8/1991 | Gotanda | 340/426 |
| 5,049,867 | 9/1991 | Stouffer | 340/426 |
| 5,055,851 | 10/1991 | Sheffer | 340/539 |
| 5,132,660 | 7/1992 | Chen et al. | 340/426 |

FOREIGN PATENT DOCUMENTS

| 2614640 | 10/1977 | Fed. Rep. of Germany. |
| 3005887A1 | 8/1981 | Fed. Rep. of Germany. |
| 2170633A | 12/1984 | United Kingdom. |

*Primary Examiner*—Donnie L. Crosland
*Attorney, Agent, or Firm*—Banner, Birch, McKie & Beckett

[57] ABSTRACT

A vehicle security system for protecting a vehicle from carjacking and from theft while the vehicle is unattended. The portion of the security system which protects the vehicle from theft while the vehicle is unattended is selectively initiated by pressing a command button on a remote control transmitter. In response thereto, a first disablement sequence is initiated which includes disabling the vehicle. The portion of the security system which protects the vehicle from carjacking is automatically initiated by the starting of the engine. A second disablement sequence is initiated upon either the sensing of a door opening while the engine is running or upon receipt of a signal transmitted by the remote control transmitter. The second disablement sequence provides a warning to persons inside and outside the vehicle prior to engine disablement and the actuation of a plurality of sirens. To enable the engine after a disablement, a simultaneous actuation of the remote control transmitter and a concealed switch is required.

25 Claims, 3 Drawing Sheets

VEHICLE SECURITY SYSTEM INCLUDING AN ANTI-CARJACKING SYSTEM

BACKGROUND OF THE INVENTION

1. Field of the Invention

The present invention relates in general to vehicle security systems. More specifically, the invention relates to an electronic and mechanical system for protecting a vehicle from theft, regardless whether the vehicle's engine is running.

2. Description of the Related Art

Vehicle thefts are a major problem in today's society. In 1991, the United States alone had 1,661,738 vehicles which were reported stolen. On a smaller scale, that amounts to 1 out every 117 registered vehicles, or a single vehicle every 19 seconds. These thefts have an aggregate estimated cost of over 8.3 billion dollars.

Thefts of parked automobiles have been rapidly increasing over the last few decades. These thefts have traditionally required the thief to "hotwire" the automobile before driving away. The advent of alarm systems have typically protected the vehicle from amateur thieves, but most alarm systems have usually only provided a small obstacle for the professional thief.

Within the last decade, and more specifically within the last few years, many criminals have been resorting to a method of stealing cars commonly referred to as carjacking. Carjacking is defined as the taking of a motor vehicle from the person or presence of another by force, violence, or intimidation. In the majority of carjackings the use of handheld firearms are the weapon of choice to coerce the owner to leave the vehicle.

Carjackings most frequently occur while the owner is driving the vehicle and is temporarily stopped, e.g., at a traffic light. However, carjackings can take other forms. One such form has been to forcefully confront the car owner before the owner enters the car. Once the thief gets the owner's keys, the car is easily taken. This scenario frequently occurs in gas stations and parking lots. Other forms employ a technique of "bumping" an intended vehicle or alerting the driver to a possible vehicle deficiency, causing the driver to pull over thereby facilitating the taking of the vehicle.

Carjacking has become a very popular crime among thieves because of the lack of expertise required to successfully perform a carjacking. Stealing a parked automobile typically requires some form of "hotwiring" experience, while carjacking only requires some sort of coercion, such as with a gun or other weapon, and a propensity to place innocent persons in danger. In 1991, a total of 19,012 carjackings were reported in the United States. Of these carjackings, 6,800 were performed in Los Angeles alone.

Due to the rising value of stolen vehicles, the easy access of handguns, and troubled economic times, the number of carjackings has been rapidly increasing. This increase in carjackings has resulted in a national crisis for which the United States Congress has even considered making it a federal crime. Some states have already passed laws distinguishing it from grand theft auto in attempting to defer carjackings by the imposition of stiffer criminal sentences. While the amount of carjackings are still a small percentage of total vehicle thefts, they produce devastating effects to the victims which may not exist in the theft of unattended vehicles. Armed personal confrontations which occur during carjackings frequently leave the owner feeling helpless and violated. Further, owners under the threat of a carjacking, who refuse to leave the vehicle or leave the vehicle too slowly, may end up suffering serious bodily injury or even death.

Many attempts have been made to provide vehicle security systems to prevent automobile thefts, however, no present security system can protect a vehicle from all the above theft techniques. Further, many systems which have attempted to prevent some of the theft techniques include drawbacks. A first group of security systems attempt to solve the theft problem by including a device for disabling the engine of a car, preventing its unauthorized use. After disablement, some systems prevent subsequent starting unless the proper passcode or switch has been pressed. Other systems permit engine starting as normal, but will disable the vehicle after a period of time, if a proper switch is not pressed. However, none of these systems provide protection against carjackings.

For example, U.S. Pat. No. 4,064,547 to Zagwyn incorporates a series of operator controlled switches directly connected into the electrical system. Each switch must be correctly set for enabling the vehicle's engine to start.

Other attempted solutions are disclosed in U.S. Pat. No. 4,485,887 to Morano and U.S. Pat. No. 4,302,747 to Belmuth. These patents prevent unauthorized engine running by disabling the engine after the ignition switch is turned off. In Morano, if a push button mounted on the base of the dashboard is not momentarily depressed upon engine starting, a relay will not energize and the current path for the ignition is interrupted by a circuit breaker. According to Belmuth, if a concealed switch is not pressed within forty seconds after engine starting, the engine is subsequently disabled. While these systems help in preventing the theft of unattended vehicles, they do not help protect a vehicle during a carjacking. Further, an experienced thief would probably realized that a concealed button needs to be pressed for engine operation and could possibly find the button, successfully stealing the car in a relatively short amount of time.

Use of a portable transceiver which fits into a vehicle mounted receptacle is disclosed in U.S. Pat. No. 3,646,515 to Vodehnal. Removal of the transceiver from the receptacle disables the vehicle. Any attempt to start the engine while the transceiver is not in the receptacle initiates an alarm. Although Vodehnal may provide satisfactory protection against theft of an unattended vehicle, it provides no protection against carjacking.

A second group of security systems attempt to solve only the carjacking portion of the theft problem. However, many of these device have disadvantages, in addition to not providing theft protection to the vehicle while unattended. For example, U.S. Pat. Nos. 3,735,346 to Fox and 3,781,789 to Caleskie et al. each disclose disabling a vehicle's engine upon opening a car door. Fox delays disablement by 15 minutes to minimize danger to the driver, but once disabled the vehicle can be restarted by closure of a single switch. A disadvantage of this resetting method is that a carjacker can restart the engine and drive away upon finding the switch. According to Caleskie et al. a vehicle engine cannot be restarted until a non-reversible timer has completed its cycle. However, using a non-reversible timer may result in instances where the rightful owner cannot reset the system and start the engine because the timer has not yet expired. Further, it may result in instances where the thief can wait out the timer period and restart the engine without difficulty. Thus, neither of these systems provide a safe resetting capability which can enable the engine instantly for an authorized user.

U.S. Pat. No. 3,665,386 to Dosch prevents a vehicle hijacking by monitoring the route of the vehicle, comparing it to an expected route, and disabling the engine if any deviation from the expected route exceeds a predetermined amount. Of course, this arrangement has many disadvantages. It is not feasible for use in any situation except for vehicles which repeatedly travel the same predetermined route, i.e. trucks from a warehouse to regular suppliers or purchasers. Additionally, such a system forces a driver to take a specific route to the destination without possible deviations for traffic conditions. Such a monitoring system would also be prohibitively costly for most vehicle owners.

A third group of security systems recognizes the need for both anti-theft and anti-carjacking systems, however, these systems do not provide complete protection from all possibilities of vehicle theft. For example, U.S. Pat. No. 4,892,167 to Tejeda discloses a vehicle security system having hijack and theft protection. The system includes a vehicle door switch and a door override switch. If the door override switch is "off," and a carjacker forces the owner to open the door of vehicle while it is running, the owner may freely leave the vehicle, but the electronically controlled fuel supply system shuts off and in several seconds the motor will stop and the hijacker will not be able to restart the motor. However, if the door override switch is "on," the Tejeda system provides no protection against carjacking. Further, if a thief locates a hidden switch required for restarting the vehicle, the security system can easily be defeated. Another disadvantage of the Tejeda security system is that the anti-theft system automatically engages when the engine is turned off unless the entire security system is turned off by pressing a second override switch. A carjacking attempt will be successful if the second override switch is pressed because the security system's carjacking protection system is inhibited, permitting the engine to start and the carjacker to drive away.

U.S. Pat. No. 4,884,055 to Memmola discloses a vehicle security system having a remote control device which helps to provide hijack and theft protection by selectively arming and disarming the system. Use of the remote control device when the system is armed, a door is open, and the engine running will produce an alarm condition. A major disadvantage of this system is that a carjacker will most likely close the door before the carjacked victim is capable of finding and operating the remote control device, thus not producing an alarm condition. Further, this carjacking prevention device fails to initiate a disablement sequence upon opening a door while the engine is running. Thus, many carjacking attempts will be successful in situations where the owner cannot use the remote control device, i.e., taken by the carjacker.

The present invention contemplates a new and improved vehicle security system which overcomes these problems by providing an effective anti-theft system along with an unparalleled anti-carjacking system.

SUMMARY OF THE INVENTION

Briefly, the present invention enables a user of a vehicle to protect against all of the aforementioned theft techniques without any of the associated drawbacks of presently available security systems. Further, the present invention minimizes the possibility of injury of the owner in a carjacking attempt.

Another object of the invention is to provide a vehicle security system having different engine disablement sequences such that a first disablement sequence is designed for theft protection and a second disablement sequence is designed for carjacking protection.

It is yet another object of the invention to provide a carjacking prevention unit which has the flexibility to disable the vehicle upon the automatic sensing of the opening of the driver's door while the engine is running or upon a signal transmitted by a hand held remote control.

A still further object of the invention is to provide a vehicle security which protects the vehicle before and after disablement, as well as including a device to compel a carjacker from the vehicle immediately after disablement.

An additional object of the invention is to provide a safe, quick, easy, and reliable system which permits an authorized operator to enable the vehicle's engine after it has been disabled, while making it almost impossible for a thief or carjacker to enable the vehicle's engine.

These and other objects are achieved by the present invention which, according to one aspect, provides a vehicle security system having a disablement system for disabling a vehicle's engine and an enablement system for enabling the engine after it has been disabled. The enablement system includes a first input device mounted inside the passenger compartment of the vehicle for sending a first signal and a portable second input device for sending a second signal. The enablement system enables the engine only upon activation of at both the first and second input devices.

In a second aspect, the invention provides an anti-carjacking system which includes a signal producing device for producing a signal in response to a theft condition, a disablement device for disabling an engine a first predetermined time period after the production of the signal by the signal producing device, and a warning device for providing an indication that said signal has been produced a second predetermined time period after said signal has been produced. The relationship between the first and second time periods being such that the second predetermined time period is less than said first predetermined time period, to provide a warning before the engine is disabled.

In another aspect, the invention provides a vehicle security system including a theft prevention system and a carjacking prevention system. The theft prevention system prevents the unauthorized starting of the vehicle engine by including a disabling device for disabling an engine while the engine is off. The carjacking prevention system includes a disabling device for disabling the engine while the engine is running.

In yet another aspect, the invention provides a vehicle anti-carjacking system including a determination device, a visual indication device, an audible indication device, and a disablement device. The determination device determines whether a theft condition has occurred. The visual and aural indication devices provide visual and aural indications, respectively, after the determination that a theft condition has occurred. The disablement device disables the engine after the determination that the theft condition has occurred.

These and other objects and features of the invention will be apparent upon the consideration of the following detailed description of the preferred embodiment thereof, presented in connection with the following drawings in which like reference numerals identify like numerals throughout.

DETAILED DESCRIPTION OF THE PREFERRED EMBODIMENT

Figure 1:
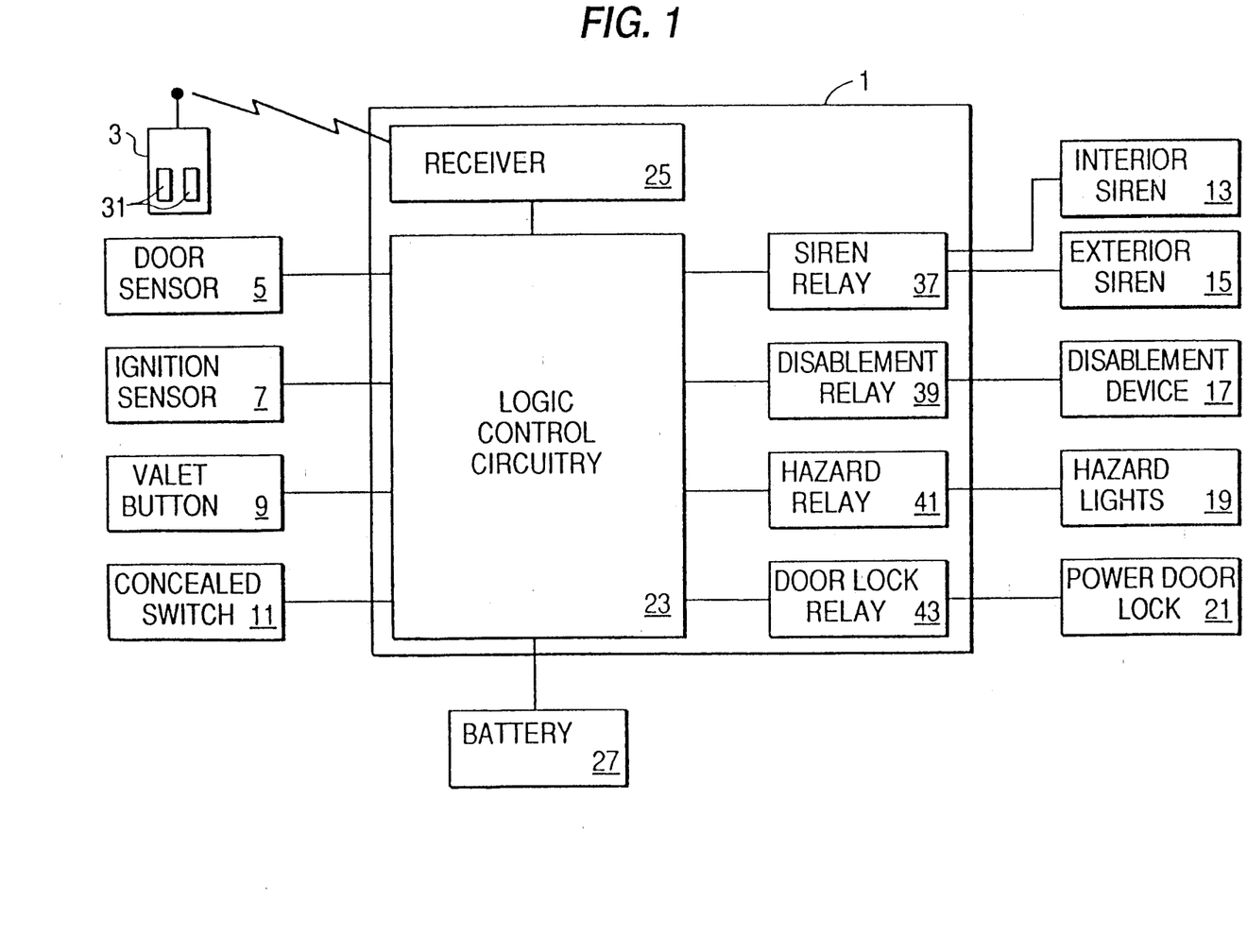
FIG. 1 is a block diagram of a security system according to the present invention.
Figure 2:
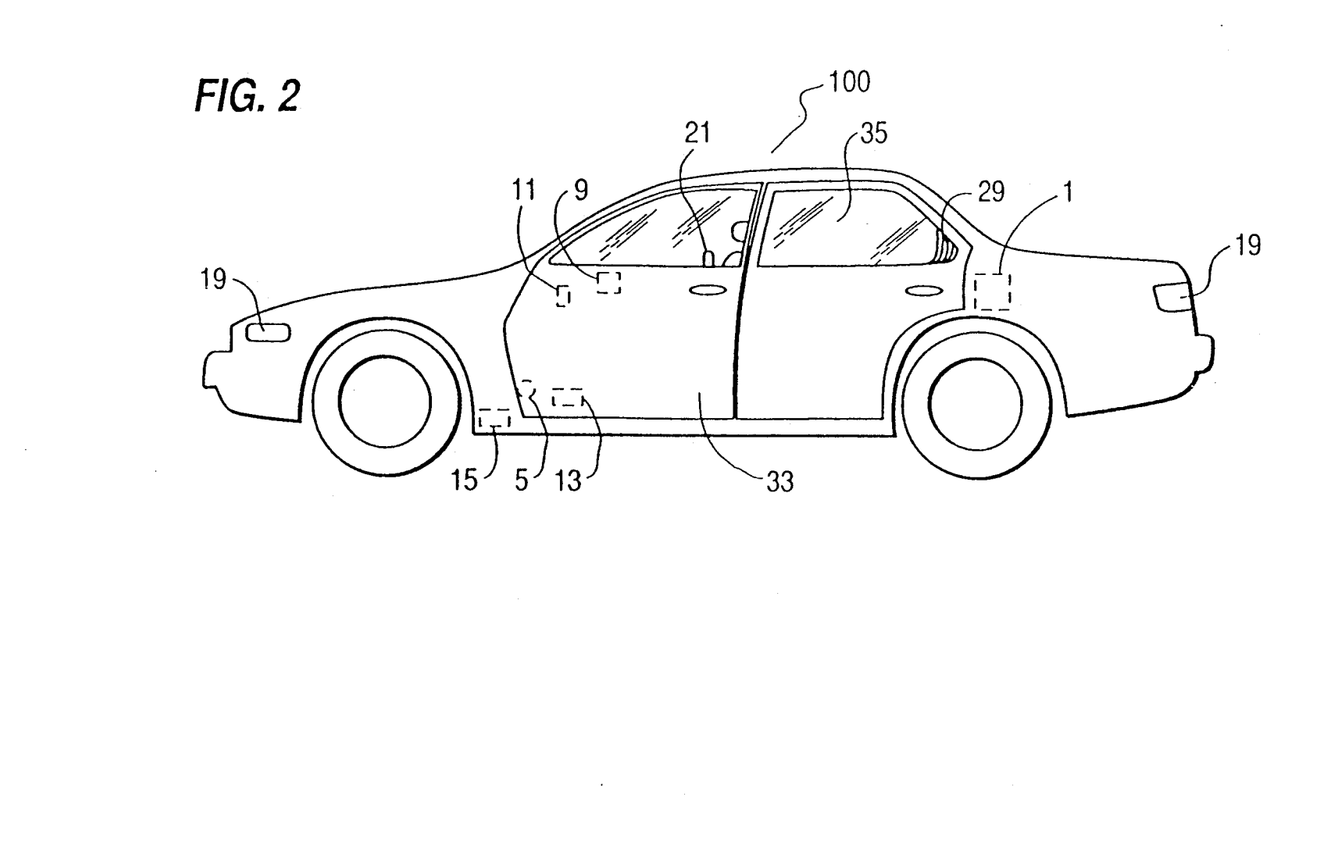
FIG. 2 is a schematic block diagram of a security system installed in a vehicle according to the present invention.

The present invention is a carjacking and theft prevention system for automobiles, trucks, and other similar vehicles. FIG. 2 shows a vehicle 100 embodying such a carjacking and theft prevention system according to the present invention. FIG. 1 shows the system of the present invention including a control module 1, a remote control transmitter 3, a door sensor 5, an ignition sensor 7, a valet or door override button 9 (hereinafter valet button), a concealed switch 11, and interior and exterior sirens 13 and 15.

The system interacts with various components of the vehicle 100. It interacts with disablement device 17 which disables and enables the vehicle's engine (not shown), as well as hazard lights 19, and power door locks 21, if the vehicle is so equipped. Although the system utilizes the vehicle's hazard lights 19, it could be designed to use other vehicle lights, e.g., brake lights, or any other light mounted to the inside or outside of vehicle 100.

Disablement device 17 is connected to either the vehicle's fuel pump (not shown) or ignition wire (not shown) for disabling the engine. For simplicity, it is preferred that disablement device 17 disables the engine by interrupting electrical power supplied to the ignition coil. However, disablement device 17 can just as effectively be connected to the fuel pump motor, to a valve inserted in the fuel line, or to any device whose operation is critical to engine operation.

FIG. 1 shows that control module 1 includes logic control circuitry 23 and receiver 25. Receiver 25 receives signals transmitted from remote control transmitter 3. Details of receiver 25 and logic control circuitry 23 will be explained hereinafter. Control module 1 is powered by the vehicle's battery 27. Control module 1 may receive power from an alternate source of power, such as a backup battery (not shown). Control module 1 is mounted to vehicle 100 in a location that is very difficult for a thief to locate, yet is easily accessible for maintenance purposes. FIG. 2 shows control module 1 mounted behind rear seat 29 of vehicle 100. Alternative mounting locations include underneath the dashboard, beneath the driver's or passenger's seat, and under the rear deck.

Remote control transmitter 3 is a small hand-held battery powered unit and includes two command buttons 31. When either command button 31 is actuated an encoded signal specific to the security system is transmitted having a maximum range of 150 feet. The transmitted signal is encoded so that several different security systems can be operated in the same local area without false triggering. Receiver 25 of control module 1 receives and decodes signals transmitted by transmitter 3. Upon receipt of a valid signal, receiver 25 outputs an appropriate signal to logic control circuitry 23 for initiating a disablement sequence. Numerous different encoding and transmission schemes well-known in the art may be used to accomplish the foregoing task. It is also well understood that remote control transmitter 3 may be designed to send signals in excess of 150 feet. Actuating either command button 31 transmits the same valid encoded signal. Having two command buttons 31 may confuse a thief who might gain control of transmitter 3, as a thief would be unaware of the existence of concealed switch 11, and spend added time pressing both command buttons in various sequences in an attempt to defeat the security system. Thus, the incorporation of a second identical command button 31, creates an additional level of theft protection. However, such protection can also be provided by including any number of command buttons 31 in excess of one. Additionally, remote control transmitter 3 can include only one command button 31, which would permit the system to function without benefitting from the additional level of theft protection.

Door sensor 5 is attached to the inside of driver's door 33 for sensing the opening of door 33. When door 31 opens, door sensor 5 outputs an opened door signal to logic control circuitry 23. Since most vehicles already include a pin switch for completing a circuit to illuminate a dome light, door sensor 5 preferably is a wire connected to the vehicle's existing pin switch for sensing the state of door 33. However, sensors including tape switches, reed switches, or other switches known in the art, may be used separately from the pin switch for sensing door 33. Under certain conditions discussed below, when door 33 is opened, a disablement sequence will start for disabling vehicle 100.

Valet button 9 is mounted within interior passenger compartment 35 of vehicle 100, and is preferably a toggle switch which is selectably movable between a normal position ("off") and an override position ("on"). In the normal position, valet button 9 has no effect upon the operation of logic control circuitry 23. When valet button 9 is in the override position, logic control circuitry 23 ignores an opened door signal from door sensor 5 and a disablement sequence is not performed. When valet button 9 is in the override position, door 33 may be opened while the engine is running without initiating a disablement sequence. This permits vehicle 100 to be valet parked or permits the engine of vehicle 100 to be left running so that the windshield can be cleaned or the vehicle engine can be warmed. Further, valet button 9 has no effect on the ability to initiate a disablement sequence by remote control transmitter 3. Valet button 9 is preferably placed in a concealed location which is known to an authorized user and within reach when driving. Ideal positions for mounting valet button 9 include inside the glove compartment, under the driver's seat, or under the driver's side of the dashboard.

Also located within interior passenger compartment 35 is concealed switch 11 which is a normally-open contact switch. Concealed switch 11 provides logic control circuitry 23 with an input upon actuation thereof as part of an enablement device for enabling the engine after it has been disabled. Concealed switch 11 is preferably a membrane switch located under the vehicle's carpeting or other padded covering, on door 33, or on dashboard to appear invisible. However, placement of switch 11 need not be concealed from view, but is preferably inconspicuous to a would-be thief. Concealed switch 11 may even be disguised on the dashboard or radio to appear as a screw, a function button, or even an ornamental feature.

The security system includes an ignition sensor 7 which determines when ignition is on as an additional input to logic control circuitry 23. Ignition sensor 7 is preferably a wire connected on the ignition side of the vehicle's fuse box (not shown) for providing a first voltage when the ignition is on and for providing no voltage when the ignition is off. However, other sensing devices for determining whether the ignition is on would be realized by one of ordinary skill in the art as providing the same purpose.

Logic control circuitry 23 receives inputs from receiver 25, concealed switch 11, valet button 9, door sensor 5, ignition sensor 7, as well as a determination of a connection to battery 27. Logic control circuitry 23 processes these inputs and, if necessary, controls system devices 13, 15, 17, 19 and 21 by controlling corresponding relays 37, 39, 41 and 43 located inside control module 1. Logic control circuitry 23 preferably includes well-known sequential or combination logic circuitry, however, a microprocessor or programmable logic array can also be used. Although FIG. 2 designates relays 37, 39, 41 and 43 as being internal to control module 1, one of ordinary skill in the art would recognize that any or all of relays 37, 39, 41 and 43 could be located outside control module 1 without affecting the function of the security system.

While disablement device 17, hazard lights 19, and power door lock 21, each have their own respective controlling relay 39, 41 and 43, interior siren 13 and exterior siren 15 share a common controlling relay 37. Thus, sirens 13 and 15 are always controlled together. Although FIG. 1 shows disablement device 17 as a separate device from its relay 39, it is understood that disablement device 17 can simply be its relay 39 located in series with the vehicle's ignition circuit, if the design of vehicle 100 permits such a configuration. However, disablement device 17 could be a device which is controlled by relay 39 without changing the function of the system.

Relays 37, 39, 41 and 43 are normally open and their operation are described below in conjunction with the operational flow chart shown in FIG. 3. In place of relays 37, 39, 41 and 43, other well-known signal conditioning circuitry can be used between logic 23 and the system devices 13, 15, 17, 19 and 21 including, but not limited to triacs and power transistors. Appropriate isolation circuitry, such as capacitive filters, optoisolation or isolation transformers, can isolate control logic 23 from noise, voltage surges and spikes.

Figure 3:
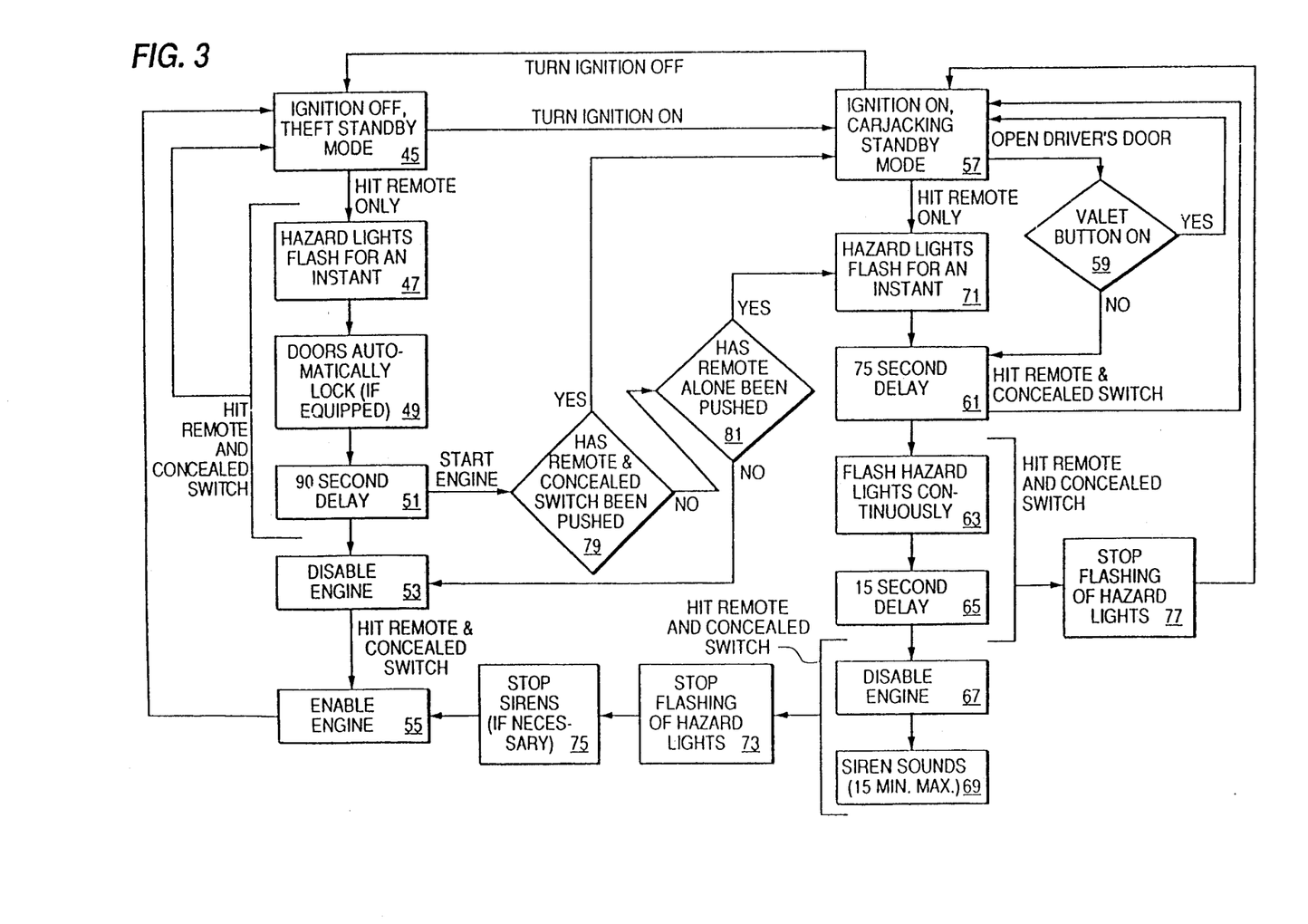
FIG. 3 is a flow diagram illustrating the operation of a security system according to the present invention.

Logic control circuitry 23 is designed to operate the security system, as shown by the flow chart of FIG. 3, to provide selectively operable theft protection and automatically operable carjacking protection. A vehicle operator desiring theft protection when the vehicle ignition is off and the alarm system is in a theft standby mode at 45 is merely required to press either command button 31 on remote control transmitter 3. Transmitter 3 transmits an encoded signal to receiver 25 and logic control circuitry 23. Logic control circuitry 23 performs an anti-theft disablement sequence at 49, 51 and 53 selectively initiated by the operator.

Before the initiation of the anti-theft disablement sequence at 49, 51 and 53, logic control circuitry 23 causes hazard light relay 41 to close for an instant and flash hazard lights 19 for an instant at 47 for providing visual confirmation that the encoded signal has been received and that the anti-theft disablement sequence at 49, 51 and 53 has been initiated. Logic control circuitry 23 then causes door lock relay 43 to close and automatically lock power door lock 21 at 49, if the vehicle is so equipped. A first delay at 51, internal to logic control circuitry 23, is started. First delay at 51 is preferably 90 seconds in duration, however, this delay may be designed for longer or shorter than 90 seconds. At the expiration of the first delay at 51, logic control circuitry 23 controls disablement relay 39 at 53 to close and disable the engine by way of disablement device 17.

For increased theft protection, the engine can only be enabled, once disabled, at 55 by a simultaneous combination of operator actions. This combination of actions includes pressing of either command button 31 on remote control transmitter 3 and simultaneous pressing of concealed switch 11. Upon the simultaneous operator actions, logic control circuitry 23 controls disablement relay 39 to open at 55 and disablement device 17 to enable the engine, and returning to the theft standby mode at 45. Although it is preferable that logic control circuitry 23 be designed such that the combination of the operator actions be done simultaneously for enabling the engine at 55, a predetermined actuation sequence of either command button 31 and concealed switch 11 may be required for restarting the engine.

If the simultaneous operator actions are performed at any point in the anti-theft disablement sequence prior to engine disablement at 53, i.e., at 47, 49 or 51, the alarm system is returned to the theft standby mode at 45, without disabling the engine at 53.

Upon the operator turning the ignition on when in the theft standby mode at 45, the system automatically provides carjacking protection and is designated by the carjacking standby mode at 57. From this mode, carjacking disablement sequence at 61, 63, 65, 67 and 69 can be initiated by pressing either command button 31 on transmitter 3, or the opening of door 33, as sensed by door sensor 5, while the valet button 9 is in the normal position at 59. This dual method of initiation provides protection against carjackings which can occur under various scenarios. Once the anti-carjacking disablement sequence at 61, 63, 65, 67 and 69 is initiated, logic control circuitry 23 starts a second delay at 61, which is preferably about 75 seconds. After the second delay at 61 has expired, logic control circuitry 23 controls hazard light relay 41 to continuously open and close so that hazard lights flash at 63. Along with flashing of hazard lights at 63, a third delay at 65 of approximately 15 seconds in started. When the third delay at 65 has terminated, logic control circuitry 23 controls disablement relay 39, disabling the engine at 67 by disablement device 17.

Also included for use in the anti-carjacking disablement sequence are interior and exterior sirens 13 and 15. When the engine is disabled at 67, logic control circuitry 23 controls siren relay 37 to close, thus sounding both sirens at 69. While both sirens 13 and 15 preferably produce a piercing sound level, they are designed as such for different purposes. Interior siren 13 operates at a high decibel level, and sweeps through the frequencies of 2800-3000 Hz, the range of human pain, compelling the carjacker to immediately leave vehicle 100. A siren which can achieve the desired result is model number PS-590L manufactured by Japan Electronic Manufacturers Agency Inc., which operates at 115 decibels and sweeps between 1500 and 3500 Hz. Operating at a high decibel level at varying frequencies, exterior siren 15 is piercing to draw attention to vehicle 100 so that bystanders might witness the fleeing carjacker and possibly notify police of the situation. A siren performing this function well is model number PS-386A manufactured by Japan Electronic Manufacturers Agency Inc., which operates at 120 decibels and cycles between 6 different frequencies within the range of 1500–3500 Hz. Although specific sirens have been disclosed, it is well understood that numerous other sirens can be used for compelling the carjacker to leave vehicle 100 or drawing attention to vehicle 100.

Logic control circuitry 23 includes a timing device for controlling both sirens 13 and 15 so that they sound for a maximum time period and then automatically shut off. Many governmental noise ordinances impose time limitations on sirens, so it is believed that a preferred 5 minute maximum would be sufficient for complying with even the most stringent ordinances. Both sirens 13 and 15 are preferably mounted in any concealed location. For example, interior siren 13 can be mounted inside a speaker cover, while exterior siren 15 can be mounted underneath vehicle 100.

If the anti-carjacking disablement sequence is initiated by pressing of a command button 31 on the remote control transmitter 3, logic control circuitry 23 controls hazard light relay 41 to close for an instant, and flash hazard lights 19 for an instant at 71, providing visual confirmation that the signal has been received and that the anti-theft disablement sequence at 49, 51 and 53 has been initiated.

Once disabled at 67, the engine can only be enabled at 55 by the same simultaneous combination of operator actions described for the anti-theft system. In addition to enabling the engine at 55, the simultaneous operator actions also causes hazard light relay 41 to stop flashing hazard lights 19 at 73 and siren relay 37 to stop sounding the sirens at 75, if, of course, sirens 13 and 15 have not yet been terminated by expiration of the appropriate time period. Further, the simultaneous action returns the system to the carjacking standby mode at 45.

The net effect of the second and third delays at 61 and 65 is to permit the carjacker to drive vehicle 100 a distance away from the owner for the owner's safety before disablement. An immediate disablement would keep the carjacker close to the owner and permit the carjacker to possibly inflict pain and/or additional distress to the owner. Further, limiting the time to a minute and a half makes it unlikely for vehicle 100 to be driven to a chop-shop for dismantling and resale of individual parts.

Even though a thief inside vehicle 100 will likely notice hazard lights 19 flashing, two important purposes are served by flashing hazard lights for a third delay period at 61 before disablement at 67. First is to protect vehicle 100 from nearby traffic before disablement at 67. Thus, the traffic following a carjacked vehicle would tend to be alerted and more cautious and less likely to have an accident with the carjacked vehicle upon disablement. Also, in the case when remote transmitter 3 is inadvertently actuated, an owner is warned of an impending disablement and is provided adequate time for preventing engine disablement at 67 by pressing a command button 31 and concealed switch 11 simultaneously. This simultaneous action stops hazard lights 19 from flashing at 71 and returns the system to the carjacking standby mode at 57. A carjacker would not be able to prevent disablement at 67 in such a short period of time because remote control transmitter 3 would not be available or the location of concealed switch 11 would not be known.

Although the second delay period at 61 and third delay period at 65 are preferably 75 and 15 seconds, respectively, these time periods could be chosen to be different and still achieve the desired results of the invention. Further, use of a first delay at 51, equivalent to the combination of second and third delays at 61 and 65 requires one less timer for logic control circuitry 23, as it is well known to arrange timers to operate sequentially.

If simultaneous operator actions are performed at any point in the anti-carjacking disablement sequence prior to engine disablement at 67, i.e., at 61, 63 or 65, the alarm system is returned to the carjacking standby mode at 57, without disabling the engine at 67. If hazard lights 19 have started to flash at 63 before the simultaneous operator actions are performed, flashing of hazard lights 19 will also be terminated at 77.

Also included in the alarm system is a temporary mode at 79 and 81 which is entered from the anti-theft disablement sequence, upon starting of the engine during the first delay period at 51. In this temporary mode, simultaneous pressing of a command button 31 and concealed switch 11 at 79 before the expiration of the 90 second delay at 51 results in the alarm system being configured in the carjacking standby mode at 57. The pressing of a command button 31 alone at 81 before the expiration of the 90 second delay at 51 provides confirmation of the command by flashing hazard lights 19 for an instant at 71 and subsequently transfers the system into the beginning of the anti-hijacking disablement sequence at 61. If a command button 31 on remote control transmitter 3 is not pressed at 81 prior to the expiration of the 90 second delay at 51, the engine is disabled by the disablement device 17 at 53 in the anti-theft disablement sequence.

A method of disarming prior art alarm systems is to disconnect and reconnect a connection to the vehicle's battery. However, logic control circuitry 23 is designed so that disconnection and reconnection of power does not defeat the system. Breaking the connection between battery 27 and logic control circuitry 23 disables the engine and defaults the system to engine the disablement state at 53. If the engine has been disabled by either disablement sequence at 55 or 67, or by disconnecting battery 27 from unit 1, normally open disablement relay 39 would necessarily be open. Disablement relay 39 requires an affirmative control signal from circuitry 23 to close. It cannot be closed upon the reconnection of power alone. Only by simultaneous pressing of concealed switch 11 and remote control 3 is disablement relay 39 closed. Thus, any attempt to thwart the security system by disconnecting the battery will be ineffective.

It is important that the theft prevention feature be selectively initiated. Prior art devices which automatically initiate an anti-theft device would make it impossible for a rightful owner to get a safe distance away from a carjacker when the ignition of the car is temporarily turned off, e.g., at a gas station, because the engine could not be started. It would therefore place the rightful owner in a position of danger. Whereas, the selectively initiated theft prevention feature of the present invention permits the rightful owner to be a safe distance away from the thief before the engine is disabled. Further, it is not desirable to have the engine automatically disabled when the car is being serviced as the service person would have to be notified of the operation of the system, including the location of all secret switches, and provided with any necessary apparatus, i.e., remote control, to enable the engine.

It is also important that the carjacking prevention feature is automatically initiated because selectively initiated systems do not protect the owner in the event the owner fails to arm the system. Whereas the automatically initiated carjacking prevention feature of the present invention protects a forgetful owner from successful carjackings because it is not necessary to arm the feature.

To exemplify the capabilities of the invention, several scenarios are described below which highlight the protection afforded by the security system of the present invention.

Assume an operator drives vehicle 100 to a shopping mall and turns the engine off. After the engine is off, if the operator chooses to protect vehicle 100 from theft, a command button 31 on remote control transmitter 3 must be actuated. The hazard lights 47 will flash, letting the operator know that the anti-theft disablement sequence has been successfully started. Ninety seconds later, the engine is disabled at 53 and vehicle 100 cannot be stolen. The engine is enabled at 55 only by simultaneous pressing of a command switch 31 and concealed switch 11.

If, however, a thief is able to hotwire vehicle 100 within ninety seconds after initiation of the disablement sequence, vehicle 100 will not be driven very far because the engine will be disabled at the end of the 90 second delay period. Additionally, if the operator sees the theft in progress, a command button 31 can be actuated for initiating the anti-carjacking disablement sequence, which includes internal and external sirens 13 and 15.

In another scenario, the operator is stopped waiting for a traffic light to change when a carjacker appearing at the window points a gun at the operator and demanding the vehicle. To end the confrontation and the possibility of injury, the operator merely complies with the carjacker's demands knowing that the vehicle will not get more than 90 seconds away. The opening of door 33 with the engine running initiates the anti-carjacking disablement sequence at 61 in FIG. 3. Additionally, even if valet button 9 is in the override position, the operator uses remote control transmitter 3, previously hidden in, for example, a pocket, to actuate a command button 31. Hazard lights 19 will flash for an instant notifying the operator that the carjacking attempt will be foiled. Seventy-five seconds later at 61, the carjacker notices the flashing hazard lights at 63. Fifteen seconds later at 65, vehicle 100 will stop as the engine is disabled at 67. The carjacker will then decide to abandon the carjacking, compelled by the painful sound of the interior siren at 69. It is likely that the carjacker will be observed as vehicle 100 is abandoned because the sound of exterior siren at 69 draws the attention of onlookers.

In yet another scenario, an operator is approaching their car in a parking lot or pumping gas at a gas station, when a carjacker demands the car threatening the operator with a knife. The operator wisely turns over the keys and lets the carjacker start the engine and drive away. At this time, the operator retrieves remote control transmitter 3 from a pocket, for example, and actuates a command button 31. As in other scenarios, hazard lights 19 flash for an instant at 71 notifying the operator the carjacking attempt will be foiled in the same manner described above.

In a different scenario, a driver is struck in the rear bumper by a following car. The driver pulls over to exchange license numbers and other relevant information. Seconds later, the driver of the following car pulls out a handgun and demands the keys to the target car. At this point, the operator can prudently turn over the keys and foil the carjacking attempt by activating remote control transmitter 3 when the vehicle is a safe distance away, in the manner discussed in the previous scenario.

While particular embodiments of the invention have been shown and described, it is recognized that various modifications thereof may be apparent to those skilled in the art without departing from its spirit. Therefore, the scope of the herein-described invention shall be limited solely by the claims appended hereto.

What is claimed is:

1. A vehicle security system for use with a vehicle having an engine and an interior passenger compartment, the security system comprising:
   disablement means coupled to the engine for disabling the engine;
   enablement means coupled to the engine for enabling the engine after being disabled;
   a first input device being located in the interior passenger compartment for providing a first signal to the enablement means when the first input device is actuated; and
   a second input device detached from the vehicle for transmitting an encoded signal when the second input device is actuated, wherein the second input device includes a remote control unit;
   wherein a disablement sequence, which includes the disablement of the engine by the disablement means, is initiated in response to the receipt of the encoded signal when the engine is not disabled, so that the engine may be disabled by a user located externally of the interior passenger compartment;
   whereby the enablement means enables the engine in response to receiving both the first signal and the encoded signal when the engine is disabled.

2. The vehicle security system according to claim 1, wherein the first input device comprises a switch.

3. The vehicle security system according to claim 1, wherein the enablement means enables the engine upon the simultaneous actuation of the first input device and the second input device.

4. The vehicle security system according to claim 1, the system further comprising:
   signal producing means for producing a theft condition signal in response to a theft condition;
   said disablement means responsive to the theft condition signal for disabling the engine a first predetermined period of time after the theft condition signal has been produced by the signal producing means; and
   warning means for providing an indication that the theft condition signal has been produced, the indication being provided a second predetermined period of time after the theft condition signal has been produced;

wherein the second predetermined period of time being shorter than the first predetermined period of time.

5. The vehicle security system according to claim 4, wherein the warning means provides the indication inside and outside of the vehicle.

6. The vehicle security system according to claim 5, wherein the vehicle further includes hazard lights and the indication includes flashing the hazard light.

7. The vehicle security system according to claim 4, wherein a difference between the second predetermined period of time and the first predetermined period of time is sufficient for an authorized user to prevent the disablement means from disabling the engine.

8. The vehicle security system according to claim 1, the security system further comprising:
   theft prevention means for preventing unauthorized starting of the engine, the theft prevention means including means for disabling the engine of the vehicle while the engine is not running; and
   carjacking prevention means for preventing theft of the vehicle while the engine is on, the carjacking prevention means including means for disabling the engine of the vehicle while the engine is running.

9. The vehicle security system according to claim 8, the carjacking prevention means further comprising means for indicating that the vehicle is not being operated by an authorized user.

10. The vehicle security system according to claim 9, wherein the indicating means includes control means for flashing lights located external to the vehicle for providing an advanced warning of disablement.

11. The vehicle security system according to claim 10, wherein the indicating means includes a first siren and a control means for activating the first siren for providing an audible alarm.

12. The vehicle security system according to claim 9, wherein the indicating means includes a first siren and a control means for activating the first siren for providing an audible alarm.

13. The vehicle security system according to claim 11, wherein the indicating means includes a second siren located in the passenger compartment and a control means for activating the second siren for providing an audible alarm.

14. The vehicle security system according to claim 12, wherein the indicating means including a second siren located in the passenger compartment and a control means for activating the second siren providing an audible alarm.

15. The vehicle security system according to claim 9, wherein the indicating means including a second siren located in the passenger compartment and a control means for activating the second siren for providing an audible alarm.

16. The vehicle security system according to claim 8, wherein the theft prevention means is selectively initiated by a user, and the carjacking prevention means is automatically initiated.

17. The vehicle security system according to claim 8, wherein the carjacking prevention means is automatically initiated when the engine is started.

18. The vehicle security system according to claim 8, wherein the vehicle further includes a door having an opened position and a closed position, the security system further comprising a sensor means for detecting the position of the door, wherein the carjacking prevention means initiates the disablement sequence when the encoded signal is received or when the door is detected in the opened position.

19. The vehicle security system according to claim 18, further comprising door override means for selectively overriding the sensor means.

20. The vehicle security system according to claim 18, further comprising verification means for flashing at least one light external to the vehicle when the encoded is received.

21. The vehicle security system according to claim 1, the system further comprising:
   determination means for determining whether a theft condition has occurred;
   visual indication means responsive to the determination means for providing a visual indication that a theft condition has occurred;
   audible indication means responsive to the determination means for providing an audible indication that a theft condition has occurred; and
   said disablement means being responsive to the determination means for disabling the engine after a theft condition has occurred.

22. The vehicle security system according to claim 21, further comprising a first timer means responsive to the determination means for producing a delay of a first predetermined period of time, wherein the visual indication means provides the visual indication after the first predetermined period of time expires.

23. The vehicle security system according to claim 22, further comprising a second timer means responsive to the determination means for producing a delay of a second predetermined period of time, wherein the disablement means disables the engine and the audible indication means provides the audible indication a second predetermined period of time after the visual indication means provides the visual indication.

24. The vehicle security system according to claim 23, &urther comprising a third timer means for producing a third predetermined period of time, wherein said audible indication is terminated after the third predetermined period of time after the audible indication means begins providing the audible indication.

25. The vehicle security system according to claim 21, wherein the audible verification means includes a first sound producing device located in the passenger compartment, and a second sound producing device located external to the passenger compartment.

* * * * *